April 9, 1940.　　　E. H. CORLETT　　　2,196,723
APPARATUS FOR PLATTING LINE MAPS FROM AERIAL PHOTOGRAPHS
Filed Oct. 15, 1937　　　10 Sheets-Sheet 1

INVENTOR
Edwin H. Corlett
BY
Frederic P. Warfield
ATTORNEY

April 9, 1940. E. H. CORLETT 2,196,723
APPARATUS FOR PLATTING LINE MAPS FROM AERIAL PHOTOGRAPHS
Filed Oct. 15, 1937 10 Sheets-Sheet 2

April 9, 1940. E. H. CORLETT 2,196,723
APPARATUS FOR PLATTING LINE MAPS FROM AERIAL PHOTOGRAPHS
Filed Oct. 15, 1937 10 Sheets-Sheet 3

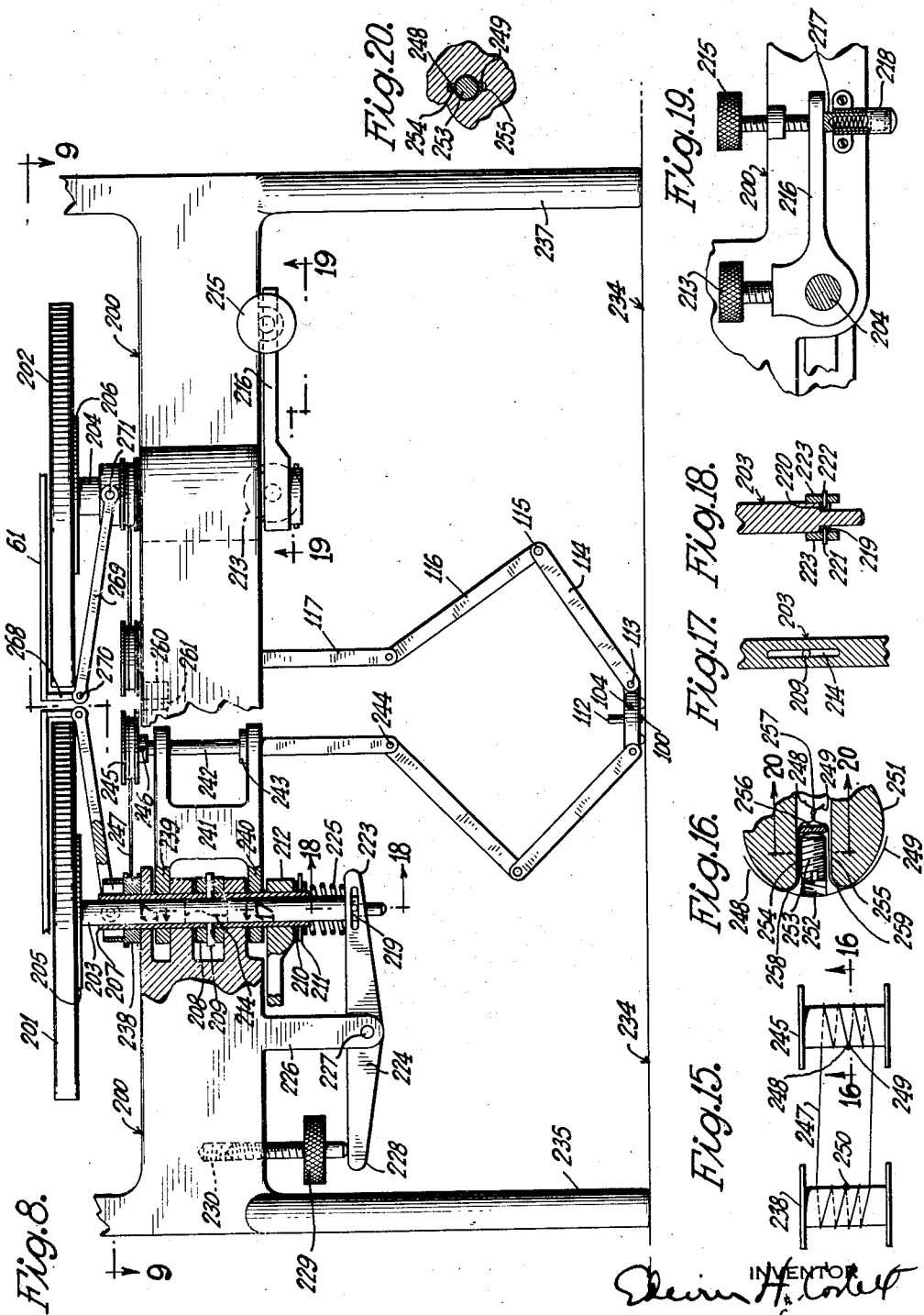

April 9, 1940. E. H. CORLETT 2,196,723
APPARATUS FOR PLATTING LINE MAPS FROM AERIAL PHOTOGRAPHS
Filed Oct. 15, 1937 10 Sheets-Sheet 5
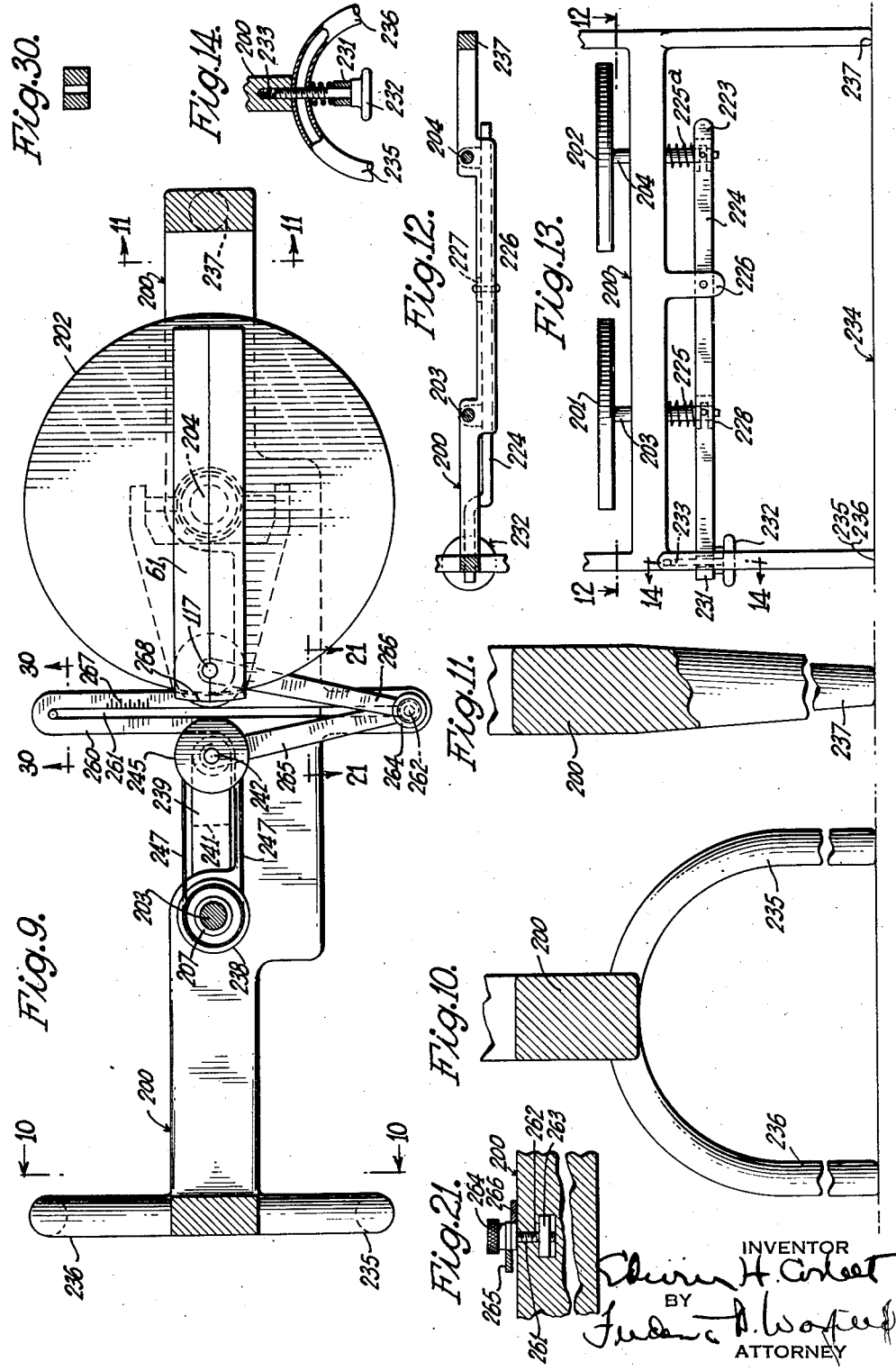

April 9, 1940.  E. H. CORLETT  2,196,723
APPARATUS FOR PLATTING LINE MAPS FROM AERIAL PHOTOGRAPHS
Filed Oct. 15, 1937  10 Sheets—Sheet 6
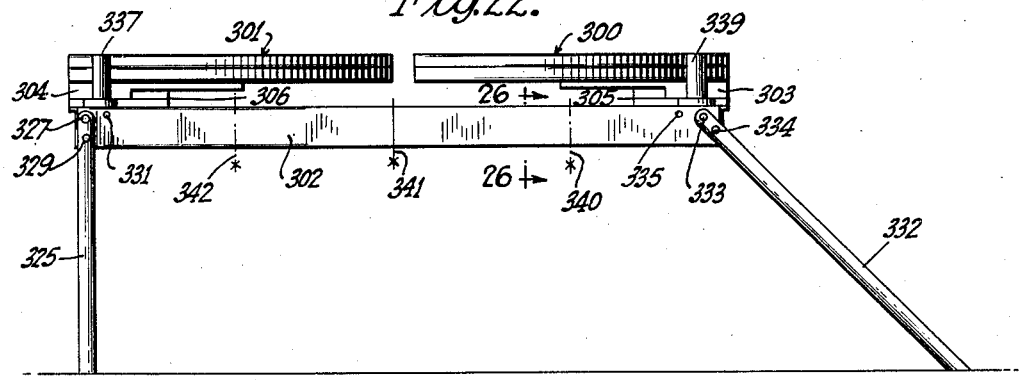
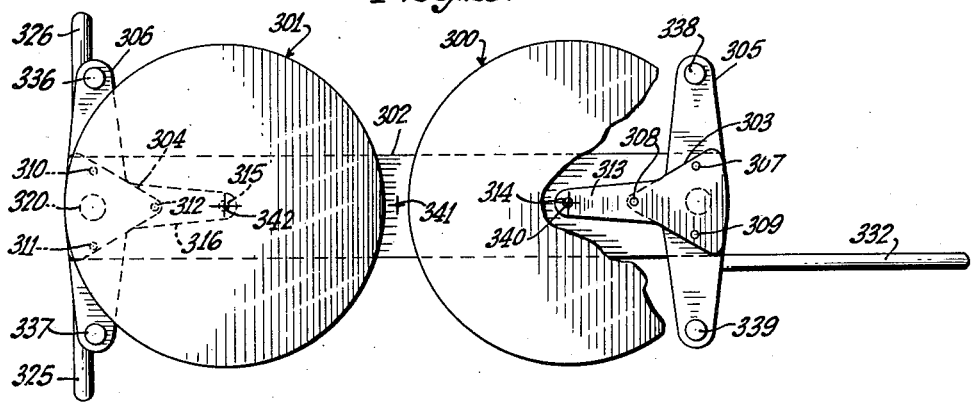
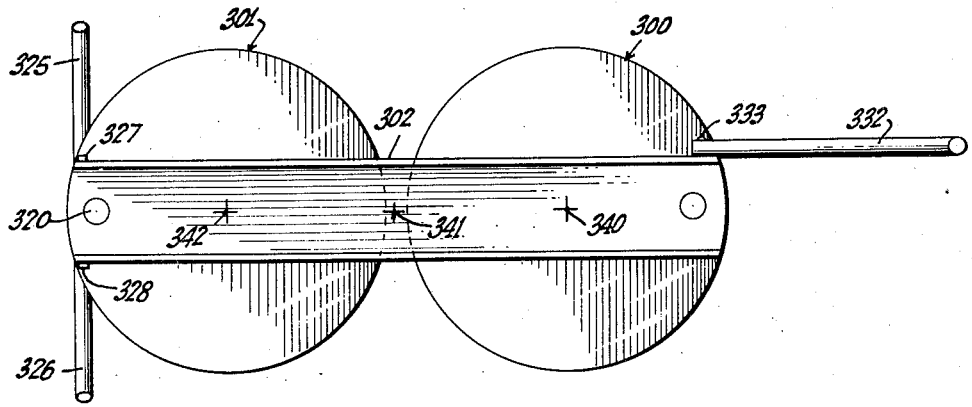

April 9, 1940.  E. H. CORLETT  2,196,723
APPARATUS FOR PLATTING LINE MAPS FROM AERIAL PHOTOGRAPHS
Filed Oct. 15, 1937  10 Sheets-Sheet 7
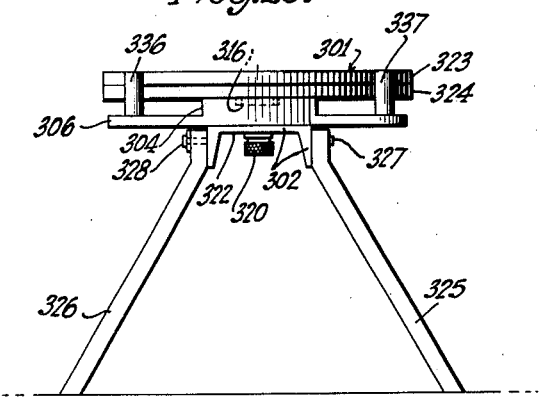
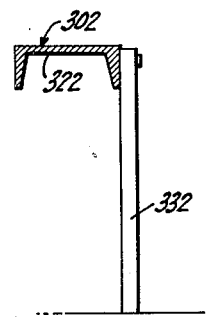
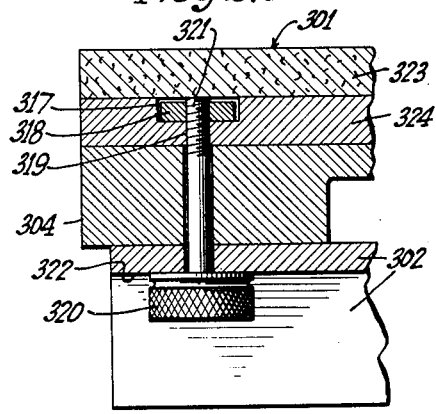
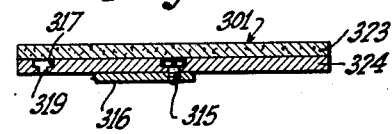
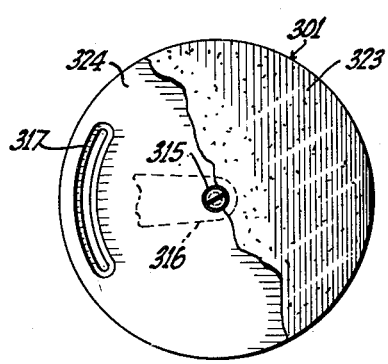
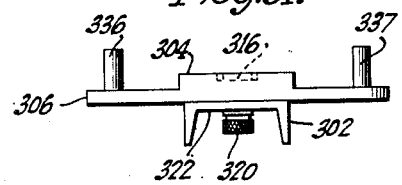

April 9, 1940.  E. H. CORLETT  2,196,723

APPARATUS FOR PLATTING LINE MAPS FROM AERIAL PHOTOGRAPHS

Filed Oct. 15, 1937   10 Sheets-Sheet 8

PLAT OF ROAD I

INVENTOR
Edwin H Corlett
BY
Frederic P. Warfield
ATTORNEY

April 9, 1940. E. H. CORLETT 2,196,723
APPARATUS FOR PLATTING LINE MAPS FROM AERIAL PHOTOGRAPHS
Filed Oct. 15, 1937 10 Sheets-Sheet 9

April 9, 1940.   E. H. CORLETT   2,196,723
APPARATUS FOR PLATTING LINE MAPS FROM AERIAL PHOTOGRAPHS
Filed Oct. 15, 1937   10 Sheets-Sheet 10

Patented Apr. 9, 1940

2,196,723

UNITED STATES PATENT OFFICE 2,196,723

APPARATUS FOR PLATTING LINE MAPS FROM AERIAL PHOTOGRAPHS

Edwin Howard Corlett, Lewisboro Township, Westchester County, N. Y., assignor to Aerial Explorations, Inc., Long Island City, N. Y., a corporation of New Jersey Application October 15, 1937, Serial No. 169,229

18 Claims. (Cl. 33—20)

This invention provides a highly simplified instrument for platting line maps, scalably free, at usually accepted limits, of relief displacements, and of other scale discrepancies, from substantially vertical aerial photographs.

It is commonly known in the art of photogrammetry that two photographs of the same terrain, each of known three-dimensional orientation, and made from two different stations of known locations, furnish data for determination of three-dimensional coordinates of all points on that terrain visible to both cameras. It is also commonly known that if the two photographs were exposed while they were substantially horizontal, the problem of determination of such coordinates, of computing them, or of platting such points by hand or mechanically, is simplified to a very great extent. In this case the vertical point, or image of nadir, is substantially coincident with the principal point, or image of the lens axis; and the scale of each photograph on each contour is substantially uniform, and, assuming the use of the same lens, varies photograph to photograph at the instant of exposure according to altitude of the airplane and therefore of the lens for each photograph.

The present invention provides an apparatus the operation of which is predicated upon the availability of two overlapping vertical photographs, each of which reveals by photographic indicia not only its own vertical point but that of the other. It is helpful, in the use of the instrument, though not necessary, to have the photographs of the same scale on a common contour, which, if not accomplished in the taking of the photographs, may be realized by enlargement or reduction of one or both of the photographs. These photographs will be referred to hereinafter as the right-photo and the left-photo.

For purpose of illustration and explanation, it may be assumed that the common terrain of the right-photo and left-photo is heavily rolling country traversed by a highway generally at right angles to the line connecting their vertical points, it being understood, of course, that the terrain being platted obviously need not be of this character.

However, in the above illustration, on the right-photo, low parts of the highway will apparently incline towards its vertical point, and high points away from it; and similar conditions exist on the left-photo. Obviously, therefore, neither the right-photo nor the left-photo presents a true plan of the highway.

Now let these two photographs be pinned to a support in such a way that their own vertical points, and each's image of the other's, lie on a straight line. Then assume two planes each to include a vertical line through each actual vertical point, then rotate both planes about the vertical lines so as to include in the right plane a point on the right photo, that is also imaged on the left-photo and to include in the left plane that same point on the left-photo. The horizontal trace of the intersection of these two planes is known in the art of photogrammetry as the "location of the point by radial intersection" and if a series of such intersections be platted of the photographically disclosed common points of the two images of the highway, the result will be a true plan of the highway, at a scale which will be a function of the scale of the right-photo and of the left-photo, and of the geographical distance between the vertical points and of the distance between the vertical points of the prints as positioned on the supporting surface.

The vertical aerial photograph of any ground not truly horizontal embodies within itself an infinite number of horizontal planes each of which has its own scale, e. g., feet per inch in the English system, one inch being equal to one hundred feet, two inches being equal to two hundred feet, etc. The reason that the aerial photograph of non-level ground varies in scale from point to point is that high ground is closer to the aerial camera than the low ground and therefore from the scale standpoint of more "moment". Obviously if this is the case, it cannot be expected that an aerial photograph of any but truly level ground will appear as a true plan or map of the terrain involved. From the standpoint of practical mensuration, or map surveying and drafting, the curvature of the earth's surface, aberrations of commonly used lenses, refraction effects met with in high-altitude aerial photography, may be neglected, the first because of its limited effect in the area of any one photograph made substantially vertically, and with present-day equipment, and the second two because distortions introduced by them are virtually radial in nature. However, for the sake of recording the fact, one can consider the bulge of any part of the earth's surface as a hill standing above a flat plane intersecting the earth's surface and defining the boundary of that part thereof; then this plane—or any chosen plane parallel thereto—will be considered the horizontal plane, and vertical points correspondingly determined with respect to it; and the resulting map will be a plane projection of the part, the data recorded on which may be used by known methods of mathematics and of drafting practice to produce a finished map, or map positions, computed as accurately as the method will allow, any desired projection, and at any desired scale.

Let there be assumed two aerial photographs exposed sequentially through a hole in the floor of an airplane which, for convenience, may be assumed to be on level flight. These photographs are so taken that each near its edge images the ground vertically below the lens of the camera when the other was exposed. The ground common to both photographs is called the "overlap area". Now, if these two photographs be set up on a drawing table so that a single straight line includes the images of the ground vertically below each at the instant of exposure, that is to say the four points represented, sequentially, (1) by the image of the ground directly under the camera when the right photograph was taken, (2) the image on the right photograph of the ground directly below the camera when the left photograph was taken, as appearing on the right photograph near its left-hand edge, (3) the image on the left photograph of the ground directly below the camera when the right photograph was taken, as appearing on the left photograph near its right-hand edge, and (4) the image of the ground directly under the camera when the left photograph was taken, then a straight line may be drawn from the point on the left photograph under the camera at the instant of exposure, herein called the vertical point, to and beyond the image of any object in the overlap area, this line being a radial line.

Also, there can be drawn from the vertical point of the right photograph a similar radial line through the image of the same object on the right photograph.

These two lines are bound to intersect at some remote point, since they are non-parallel and lie in the same horizontal plane.

If now another radial line be drawn through the vertical point of the left photograph through another object in the overlap area, and the operation be repeated from the vertical point of the right photograph through its image of the same point, there is produced another intersection.

This operation may be repeated as often as may be desired, in order to plat the location of disconnected map points, or there may be platted a series of points which determine the shape of any one object.

The map made by the intersections reveals the objects in their correct relative positions, and not in their probably radially distorted positions as each photograph reveals them.

The above-described procedure is known as platting by "radial intersection", and will be referred to more particularly hereinafter in connection with the detailed description of the apparatus of the present invention.

Various forms of photogrammetric apparatus have been devised for producing the above-indicated result, the basic purpose of all these apparatuses being the platting of contours from photographs, mainly aerial. In the better type of machines these contours are platted without being distorted by relief displacement, as they would be if they were platted by identification of detail directly on the aerial photograph. This means that inherent in the platting mechanism and processes are means for raising or lowering whatever device, commonly called a floating mark, is used to enable the operator optically to follow the apparent contour on the topographic model—which is the apparently three-dimensional photograph one sees when a stereoscope is used. However, in order to plat the true shape of an object distorted by relief displacement on the aerial photographic surface, the operator of existing equipment must make continuing adjustments, or vertical adjustments, for tracing the outlines of the object in the photograph.

From the above discussion, it will be appreciated that one object of the present invention is to provide a simplified form of apparatus which is designed to produce a true plan or map from intersections of radial planes through images common to the overlap area of two overlapping aerial photographs, regardless of the magnitude of the relief and the amount and direction of a relief displacement, that is to say, the tendency of high objects to appear farther away from the center than they really are, and low objects conversely, these being the results of the differences in scales, as mentioned above.

A further object of the invention is to provide an apparatus of the above-indicated character whereby the operations of platting by radial intersections are performed mechanically and either continuously rather than as a series of sequential drafting operations, or selectively in a sequential procedure, wherein, however, the projections of radial intersections are located mechanically, rather than by manual drafting technique, the apparatus being of a relatively simple construction and relatively low in cost.

A further object of the invention is to provide an apparatus of the above-indicated character which enables the operations of platting by radial intersections to be performed mechanically and continuously as aforesaid and without requiring any adjustments of the apparatus to be made, except when the photographs are being changed.

Further objects and advantages of the present improved construction will become apparent as the description proceeds, and the features of novelty will be pointed out in the appended claims; and the invention accordingly comprises the features of construction and combination of elements which will be exemplified in the construction hereinafter set forth, and the scope of the application of which will be indicated in the claims.

It has been said above that if the two photographs be pinned to a support in such a way that their vertical points, and each's image of the other's as described above, lie on a straight line and assuming two planes, each to include a vertical line through each vertical point, to be rotated about the vertical lines so as to include in the right plane a point on the right photograph that is also imaged on the left photograph, and to include in the left plane that same point on the left photograph, there will be an intersection of the two planes, the horizontal trace of this intersection being known in the art of photogrammetry as the location of the point by radial intersection.

The device of the present invention provides a mechanism for accomplishing the following general purposes:

1. Mechanically locating on a surface the horizontal trace of the intersection of the two vertical planes.

2. Enabling the operator to pass simultaneously the right plane through the image of a point on the right photograph and the left plane through the image on the left photograph of the same point.

3. By virtue of (1) and (2) above, enabling the operator to mark the continuous vertical trace of the intersection of the two planes as they each respectively proceed from common point to common point along the infinite number of such common points that determine the two images of a line on the terrain.

In accordance with the present invention, the apparatus comprises generally a platform or table supported above a drawing surface, upon which table each of the overlapping photographic prints is placed. A vertical rotatable shaft has its center line coincident with the vertical point of each photograph. Connected to each vertical shaft is an arm under the table which holds the print, which extends beyond its edge and supports an angle member which is thicker than the table supporting the prints. The top of this angle member is made fast to the end of a glass strip so placed that a gauge line scratched on the bottom of the glass strip extends from the edge of the table supporting the print through and beyond the vertical point of the print itself. The result is that when this vertical shaft is moved the glass strip rotates in a horizontal plane about the center line of the shaft.

At another place on the shaft is secured a bar at right angles both to the center line of the shaft and the vertical plane through the gauge line on the strip of glass, being in effect a hinge pin. To this bar is attached a strip of material, which may be wood for convenience, several inches long.

At the other end of this strip of wood there is attached one side of another hinge, the other side of which is attached to a rigid structural member.

There is thus produced a hinged linkage, capable of universal motion, as will be apparent more clearly hereinafter, the whole assembly being referred to hereinafter as a "grasshopper leg," for want of a term better descriptive of the appearance of this structure, the first strip mentioned forming the thigh, the second the shin, the first hinge forming the hip joint, and the second the knee. This construction is duplicated for each of the two shafts pertinent to each of the two pictures.

At the end of this structure, the "shin" portion, there is another hinge arrangement on each of the two legs. The other end of each of these hinges, which corresponds to "ankles", is a member called a "foot"; the two feet guide, partially support, center on, and are horizontally rotatable about a tracing point or pencil, the vertical center line of which is included within the vertical planes through respectively the gauge on the left-hand glass strip, the center line of the left-hand vertical shaft, and the gauge on the right-hand glass strip, and the center line of the right-hand vertical shaft.

By moving the feet and pencil, the "grasshopper legs" move in and out in various positions, and at the same time the glass strips move.

The pencil or tracer point is the trace on the drawing surface of the two vertical planes mentioned above, and in order to plat the correct location on the drawing surface of an object shown in the common overlap area, all that it is necessary to do is to pass a vertical plane through the vertical point of the picture and through the image of the object, which is what is done when the gauge line is passed through the vertical point of the picture and through the image of the object.

Now, if the two photographs be viewed under the common mirror stereoscope, the common area is seen in relief, as a plastic model. The gauge lines of the two strips of glass are seen as two lines which intersect at some angle. By manipulating the pencil, moving it right, left, forward, or backward, or any combination, the intersection of the two lines as seen through the stereoscope may be made to follow any object in this plastic model uphill and downhill while the pencil traces the true shape of that object independently of the relief distortions inherent in the vertical photographs If the drawing is too large, there may be utilized for either the left-hand photograph or the right-hand photograph an off-set plane in order to bring the pencil point (the intersection of the vertical planes on the drawing surface) closer into the machine, and make the drawing smaller in scale. Any number of ways may be devised to make an off-set plane, that shown in the accompanying drawings, being convenient. As may be seen from the drawings, there may be used for this purpose two pulleys of the same size actuated by a piano wire belt made fast to both, one of the pulleys being fast to a vertical-point shaft and the other operating the tracing linkage ("grasshopper legs"), otherwise operated by that vertical-point shaft.

The resulting map is a "flat line-map", free from relief displacements.

In the above generally described apparatus, it is desirable to reduce as much as possible the thickness of the glass radial arms, thick glass sometimes resulting in a disturbing "field of refraction" being injected into the usual topographic model field, the condition being worse as the glass becomes thicker, and conversely. Also, it may be desirable to magnify any desired local part of the field of the topographic model. In most cases, this part of the field probably will be that part of the field which lies at the apparent intersection of the gauge lines on the glass radial arms or other gauge line holder.

There may be used for this purpose a simple magnifier for each print, for example, a so-called "stamp magnifier", which is usually a hemispherical piece of clear glass which, when placed on a flat surface, magnifies objects on that surface. This stamp magnifier may be placed in a frame which allows it to slide back and forth as may be desired on the glass radial arms, it being substantially centered above the gauge line in each case.

Let it be assumed that the apparent crossing of the gauge lines when two prints are viewed through a single stereoscope is at a situation where magnification would be desired. The operator of the present apparatus slides each stamp magnifier along the radial arm until it centers over not only the gauge line but also the detail in which the operator is interested. The operator then sees the limited field magnified considerably beyond that of the general field of the topographic model and within more or less narrow limits he is able to manipulate the apparent crossing of the gauge lines to sketch out, with the tracing pencil in its holder, the fine details of the particular situation.

When the two magnifiers are to be used frequently there may be provided a bar with a loop on each end, each loop to be just the size to fit, but not too snugly, over each magnifier. The bar itself is made in two parts, and is extensible, because the magnifiers may not be always a fixed distance apart. Once this bar with magnifiers is set for any one pair of prints, and if the magnification or the relief be not too great, the bar with the two magnifiers may be handled as a unit for successive or intermittent magnifications; the operator may use one hand to manipulate the tracer holder and one hand to move the bar with the magnifiers, to provide continuous magnification as long as it is desired to keep up the process.

There are several ways to provide for the connection of the bar to the frame of the stereoscope or of the apparatus by suitable linkages to maintain the bar parallel to the longitudinal axis of the apparatus, no matter where it may be moved, this is in order to facilitate a continuous use of the magnification of the two magnifiers, with or without the use of the glass radial arms and the inscribed gauge lines. Also, the bar may be connected by a sliding swivel-channel, at each magnifier, to rest on the glass radial arms so that if the glass radial arms are moved, the bar with the magnifiers will move with and be driven by the motion of them so that there is always the desired magnification right over the apparent intersection of the inscribed lines on the glass radial arms.

The invention will be understood more readily by reference to the accompanying drawings, which show several illustrative forms of the improved apparatus, it being understood that the construction of the machine is in no sense limited to the precise details of construction shown in the drawings, but that these details may be modified within wide limits, without departing from the inventive concept.

In the drawings,

Fig. 8 is an elevation of a somewhat different form of apparatus in which both platforms are rotatable and one is movable vertically;

Fig. 9 is a sectional plan view taken on the line 9—9 of Fig. 8, looking in the direction of the arrows;

Fig. 10 is a fragmentary sectional elevation taken on the line 10—10 of Fig. 9, looking in the direction of the arrows;

Fig. 11 is a sectional elevation taken on the line 11—11 of Fig. 9;

Fig. 12 is a sectional plan view taken on the line 12—12 of Fig. 13, looking in the direction of the arrows;

Fig. 13 is an elevational view showing details of certain of the mountings of the turntables, shown in Fig. 8, on a somewhat smaller scale.

Fig. 14 is a vertical section taken on the line 14—14 of Fig. 13, looking in the direction of the arrows, and showing further details of the mounting of the turntable supporting bar in the frame of the apparatus;

Fig. 15 is an enlarged fragmentary view showing in elevation details of the mounting of the rotating means for the turntables as shown in Fig. 8;

Fig. 16 is a sectional view on the line 16—16 of Fig. 15, looking in the direction of the arrows, showing details of the construction of one of the pulley wheels;

Fig. 17 is a vertical sectional view taken on the line 17—17 of Fig. 8, looking in the direction of the arrows;

Fig. 18 is a detailed sectional view on the line 18—18 of Fig. 8, looking in the direction of the arrows;

Fig. 19 is a detailed section taken on the line 19—19 of Fig. 8, looking in the direction of the arrows;

Fig. 20 is a detailed sectional view taken on the line 20—20 of Fig. 16, looking in the direction of the arrows;

Fig. 21 is a detail sectional view taken on the line 21—21 of Fig. 9, looking in the direction of the arrows;

Fig. 22 is a fragmentary front elevation of the apparatus, certain parts being omitted for clarity, the view showing further details of the mountings of the turntables;

Fig. 23 is a plan view of a construction generally similar to that illustrated in Fig. 1, showing parts broken away for illustration of further details of the mounting instrumentalities;

Fig. 24 is a view taken from the underside of Fig. 23, looking upwardly at the turntables as shown in Fig. 23;

Fig. 25 is an elevation of the left-hand end of the structure as viewed in Fig. 24;

Fig. 26 is a sectional elevation on the line 26—26 of Fig. 22, looking in the direction of the arrows;

Fig. 27 is a fragmentary sectional view showing details of construction for clamping the left-hand turntable as viewed in Figs. 22, 23 and 24;

Fig. 28 is a fragmentary view showing additional details of the clamping construction;

Fig. 29 is an additional sectional view of the clamping instrumentalities, showing certain additional details of the construction of the clamping means shown in Fig. 27;

Fig. 30 is a sectional view taken on the line 30—30 of Fig. 9, looking in the direction of the arrows;

Fig. 31 is an end elevation of the turntable mounting shown in Fig. 23, looking towards the left-hand end of Fig. 23;

Figure 1:
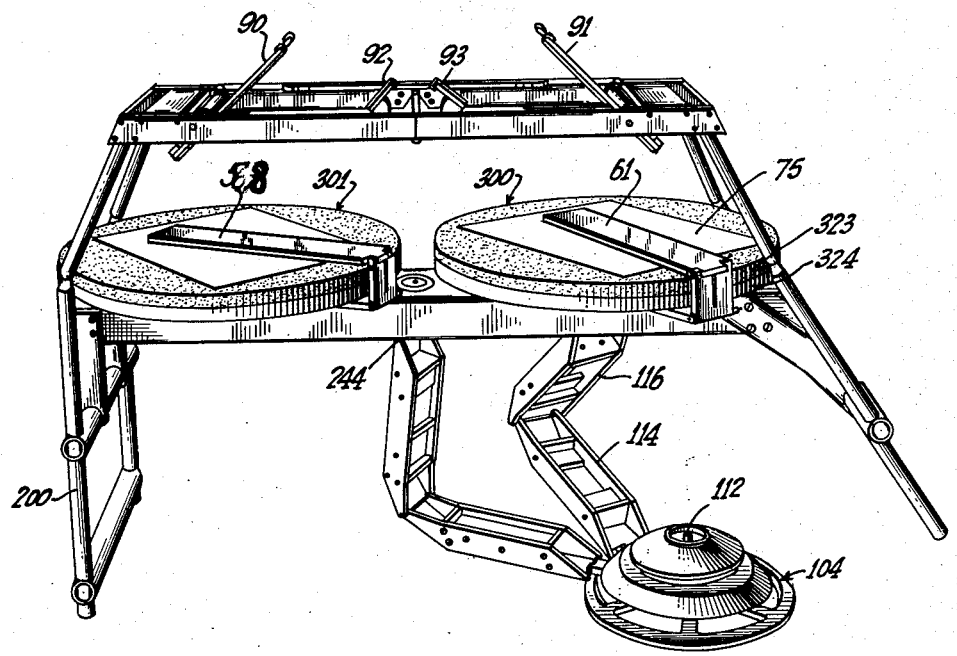
Fig. 1 represents a perspective view of a form of improved apparatus.

Referring more particularly to the drawings, and especially to Figs. 1 to 4 inclusive, the construction illustrated therein comprises end members 31 and 32 which support a cross-plate 33, platforms 34 and 35, and web braces 36 and 37 and bottom plates 38 and 39. These elements are suitably fastened together and comprise the supporting frame for the apparatus.

Spacers 40 and 41 maintain the platforms 34 and 35 in parallelism with the cross-plate 33, these spacers extending transversely of the cross-plate 33 and being suitably secured thereto and to the underside of platforms 34 and 35. A further spacer 42 maintains the bottom plate 38 in parallelism with the cross-plate 33.

Extending from the bottom plates 38 and 39 and supported in suitable end bearings bedded in the bottom plates 38 and 39 are vertical shafts 43 and 44, which pass through suitable enlarged openings 43a and 44a in the cross-plate 33, so that the shafts 43 and 44 do not come into contact with the cross-plate. An intermediate vertical shaft 45 is similarly supported in the bottom plate 38, and also in the cross-plate 33, in which an end ball-bearing is embedded to receive the upper end of shaft 45. The shafts 44 and 45 support pulley wheels 46 and 47 respectively, these pulley wheels being tightly locked on the shafts by means of set screws 46a and 47a, respectively, the pulley wheels being rotatable with the shafts. The two pulley wheels are connected by suitable means, such as, for example, a piano wire 48.

A pin 50 extends through the shaft 44 at 49, having a tight fit in the shaft 44, and pivoted snugly in its ends in metal strips 51 and 52 which are firmly fastened to a plate 53, which may be made of wood, or other material. The plate 53 carries a hinge 54, which is also fastened to an upright block 55. The block 55 carries at its edges metal clips 56 and 57 which clamp the outer end of a glass strip 58, which has on its under surface a gauge line 59 so adjusted that it passes through the projected center 60 of shaft 44. The construction above the pin 50 and the hinge 54 allows the glass plate 58 to rest on plate 35 of its own free weight and to be rotatable horizontally as the shaft 44 rotates, and so that the gauge line 59 together with the center line of shaft 44 designated previously herein the "left-plane".

An entirely similar construction is utilized to activate the right-hand glass strip 61, which has a gauge line 62 which passes through the projected center of the shaft 43, and is horizontally rotatable by that shaft. The gauge line 62 and the center line of shaft 43 determine what has been called above the "right-hand plane".

Obviously the "left plane" and the "right plane" intersect in a vertical line, but for convenience in map drafting, this intersection is too far removed from the apparatus itself; also, even if a high degree of enlargement should be required from the original photographs to the final drawings, it is not convenient to vary the distance between the shafts 43 and 44 to accomplish the result of variation of scale.

Rotation of shaft 44 by means of pulley wheel 46 is accomplished by the rotation of pulley wheel 47 and piano wire 48, which is actuated by the rotation of shaft 45.

Secured to the bottom of shaft 45 is a plate 63 to which is screwed one end of hinge 64. The other end of hinge 64 is secured to a plate 65 which forms one link of the support for the tracer point, and which, for purpose of illustration, may be regarded as the "thigh" of the "grasshopper leg" referred to above. The other end of the plate 65 has one side of a hinge 66 secured to it, the other side of the hinge being secured to a plate 67, which is reduced to and forced into a metal tube 68, this construction forming a second hinged linkage for the tracer-point mounting, the hinge 66 constituting the "knee" of the "grasshopper leg" and the "shin" thereof being the combination of plate 67 and tube 68.

At the foot end of the tube 68 is a vertical slot in which is a plate 69 so arranged as to rotate vertically about a pin 70. The outer end of the plate 69 is a horizontal sheet, preferably of metal, 71, through which is a hole to support the pencil or other tracer point 72.

The vertical plane formed by tracer point 72 and "grasshopper leg" linkages 68, 67, 66, 65 and 63, and shaft 45, is parallel by construction and adjustment to the vertical plane formed by the left-hand gauge line 59 and the center line of shaft 44.

A similar system of links and hinges, forming a second "grasshopper leg" assembly 73 connects the tracer point 72 to the shaft 43, this assembly 73 lying within the vertical plane determined by the right hand gauge line 62 and the center line of shaft 43.

Now, assume that photographic prints, which for convenience may be regarded as prints of terrain such as described previously herein and presenting overlapping areas, be placed on the turntables of the apparatus. These prints are indicated by reference numerals 74 and 75, print 74 being the left-hand photograph and print 75 being the right-hand photograph.

The center mark of print 74 is placed on the projected center 60 of the shaft 44, and the center mark of print 75 is placed on the projected center 76 of shaft 43, the point 60 being the vertical point of photograph 74 and the point 76 being the vertical point of photograph 75. The point 77 is the image on left-hand photograph 74 of the vertical point 76 of the right-hand photograph 75; and point 78 is the image on right-hand photograph 75 of the vertical point 60 of the left-hand photograph 74.

Wholly for simplicity of explanation at the present, it may be assumed that the ground represented by the points 60 and 76 is on the same contour, and that, therefore, distance 60—77 equals distance 78—76, with the further legitimate assumption that the two prints scale the same on that contour. Also, let point 79 be the image on left-hand photograph 74 of a ground point, the image of the same point on right-hand photo 75 being indicated at 80.

If now the tracer point 72 be moved so that the left-hand gauge line 59 of the left-hand glass plate 58 lies upon the point 79, and the right-hand gauge line 62 of the right-hand glass plate 61 lies upon the point 80, then the point 81, which is the center of the tracer point 72, and the centers of shafts 45 and 43, form a triangle which is similar to the two equal triangles 82—60—77 and 83—78—76, each respectively, 82 being the intersection with left-hand gauge line 59 of a line through point 77 parallel to the right-hand gauge line 62, and 83 being the intersection with the right-hand gauge line 62 of a line through the point 78 parallel to the left-hand gauge line 59.

As the drawing is made, it will be obvious to anyone skilled in the art of photogrammetry that the images 79 and 80 are those of a point higher than the contour of the two centers.

The ratio of size between measurements on the map, one point of which is represented by 81 (the center of the tracer point), and the photographs is the ratio of the distance between the center line 84 of shaft 45 and the center line 76 of shaft 43, and the distance between the points 60—77 (or between the points 78—76).

In one of the machines constructed in accordance with present invention, this ratio was computed to be 2.00 for aerial photographs of level country made from the same altitude and overlapping 60% in line of flight. However, it will be understood that this ratio will vary with individual machines. The distance 60—84 may be varied by any convenient construction, either made longer, in which case the map measurements will decrease in ratio with respect to the print measurement, or shorter, in which case the map measurement will increase in ratio with respect to the print measurement.

One way in which this may be accomplished is to provide a set of idlers 85 and 86 set preferably equi-distant from the center line 60—76, and maintained symmetrically positioned with respect to it, though variable in distance from it; while, if the distance between 85 and 86 increases, due to a fixed length piano-wire drive belt 87, the center 84 of shaft 45 will move so that distance 60—84 becomes less, the distance 84—76 becomes greater, and the ratio of measurement from contact print to map becomes greater.

Obviously, the converse of the preceding is true.

Figure 2:
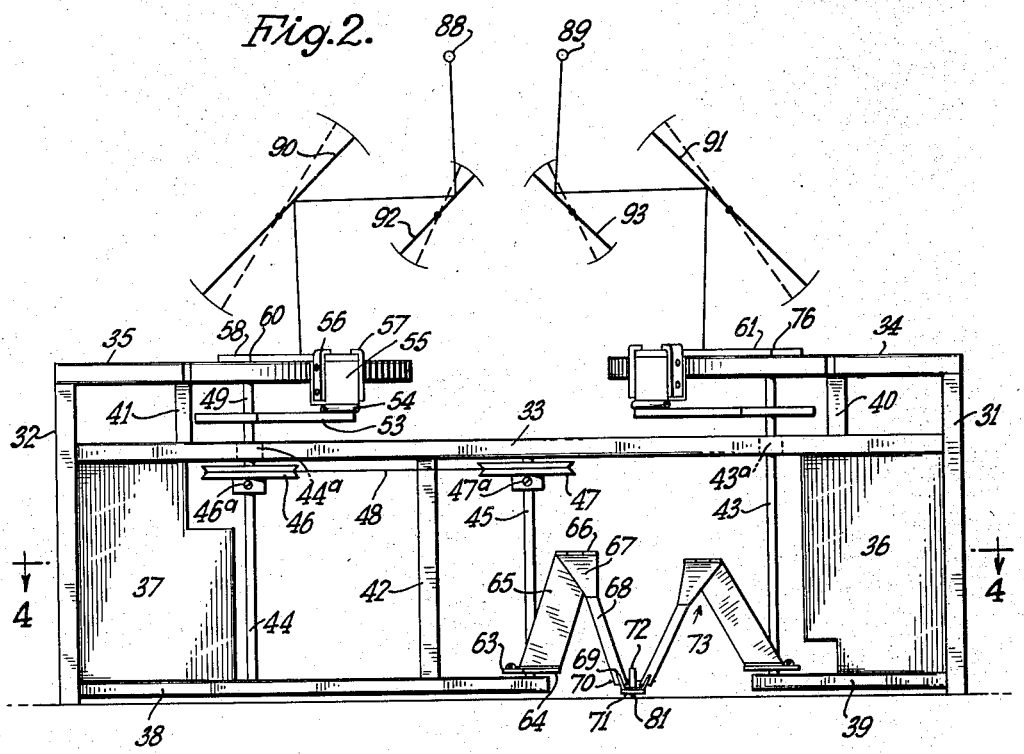
Fig. 2 represents, rather diagrammatically, an elevation of the apparatus generally similar to that shown in Fig. 1, the view being a front elevation for a right-handed operator, and a rear elevation for a left-handed operator.

There is shown diagrammatically in Fig. 2 a mirror stereoscope associated with the apparatus to enable the eyes positioned at 88 and 89 to see points 79 and 80 as one point. As the constructed distances of the mirror stereoscope must be such that the normal eyes can integrate their respective images into one three-dimensional whole, and as all overlapping photographs are not the ideal 60% forward overlap, adjustment must be provided for enabling the eyes to group images on the one hand further apart than those obtained with 60%, and on the other hand closer together than such images. This can be done by maintaining the pairs of mirrors 90, 91 and 92, 93 at their usual 45° angle as shown and varying their distance sideways, by raising or lowering either or both pairs, by suitable means, not shown, or, preferably, by rotating each pair or both pairs, the dotted line positions of the mirrors enabling the eyes to integrate two images farther apart than 79—80; conversely, if the rotation were opposite, the eyes would integrate images closer together than 79—80.

Also, at some point along the light paths 79—88 and 80—89, there may be interposed magnifying systems for convenience and facility in reading photographic detail; and also the stereoscope may be made vertically adjustable, both upwardly and downwardly for accommodation to the individual eyesight characteristics of the operator. A "roving" stereoscope may be employed, free to move forward and backward and to the right and left but not free to rotate.

A turntable 300, 301 for both rapid and slow motions may be provided on each platform 34 and 35 to enable the quick mounting and orientation of the prints 74 and 75, so that points 60, 77, 78 and 76 are enabled to be placed on the same straight line, these turntables being preferably independently vertically adjustable so that slight differences in the scale of prints 74 and 75 caused by variation in altitude of the airplane in photographic flight may be compensated for, and eye strain in stereoscopy minimized if not eliminated.

Figure 5:
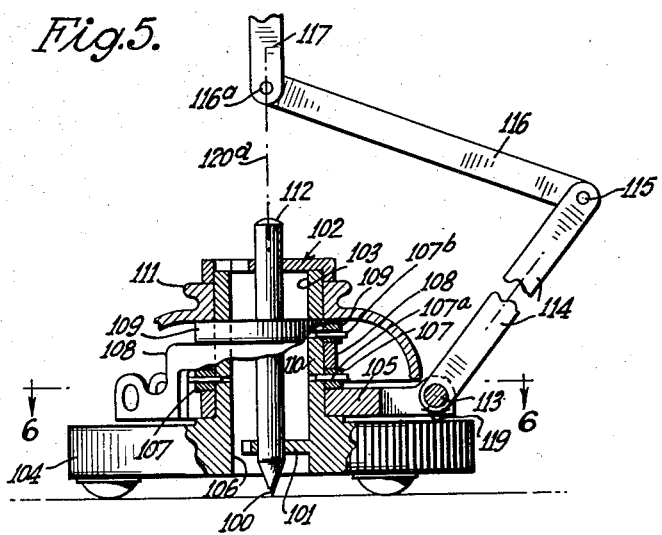
Fig. 5 is a detailed sectional elevation of the holder for the tracer point, showing certain details of construction thereof.
Figure 6:
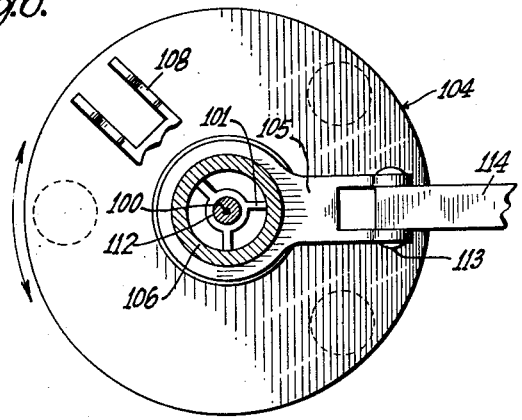
Fig. 6 is a sectional plan view taken on the line 6—6 of Fig. 5, looking in the direction of the arrows.
Figure 7:
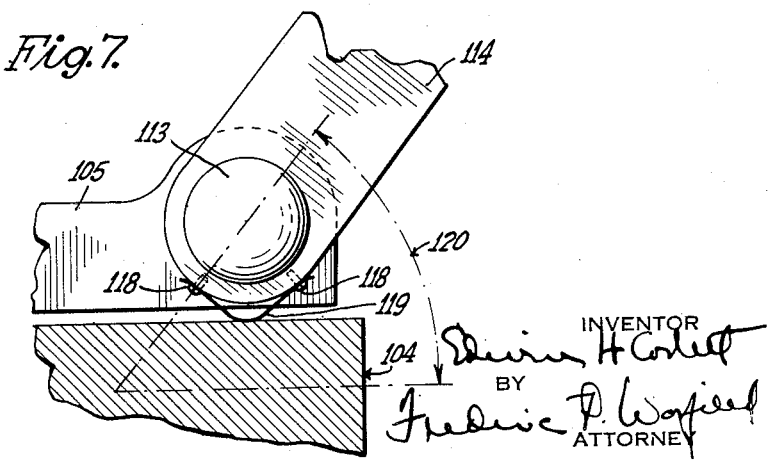
Fig. 7 is an enlarged fragmentary detail of the swivel mounting of the holder of Fig. 5.

Figs. 5, 6 and 7 show a different form of mounting for the tracer point from that shown in the preceding figures.

In accordance with these views, tracer point 100 is supported loosely but smoothly in webs 101 and 102 and is slidable vertically therein. The web 102 slips over the upper end 103 of collar extension of tracer-base 104, and the webs 101 and 102 may or may not be integral with the base 104, but for purposes of illustration, the web 101 is shown to be thus integral.

The "foot" portion of one of the above-described "grasshopper legs" is indicated by a fitting 105, which is smoothly but snugly rotatable about the tracer-base collar at 106. This fitting 105 is held snugly and without play, in its vertical position by a collar 107 which is secured by suitable pins 107a to the extension 106 of the tracer base 104.

The "foot" of the second "grasshopper leg" is indicated at 108, and this is smoothly but snugly rotatable about the collar 106 and the upper end 103 thereof, as is indicated at 110, the "foot" 108 being drop-offset to function in the same plane as the "foot" 105, the "foot" 108 being held snugly in position by a collar 109 and pin 107b.

A cap, or cover, 111 is provided as a finger grip, for the operator's fingers when tracing with the tracer point 100, which is mounted in a suitable holder 112. The cover 111 is secured in any suitable manner, such as by pins, not shown, to the upper end 103 of the base collar 106.

At the right-hand end of foot 105 is a pivot pin 113 upon which link 114 is turnable. A second link 116 is hinged to link 114 at 115, this link 116 being hingedly connected, as is indicated at 116a to the end of a shaft 117, which corresponds to say shaft 43 of Fig. 2, the pin 113 forming the "ankle" of one of the "grasshopper legs", of which link 114 is the "shin" corresponding to parts 67, 68 of Fig. 2, hinge 115 being the "knee", and the "thigh" thereof being the link 116. As shown, hinge pins 113, 115 and 116a are parallel to each other, and the same is necessarily true of the hinge pins in the left-hand linkage.

Attached to the "ankle" end of the link 114 by means of screws 118 is a spring 119, which presses against the upper surface of the base 104, the details of this construction being shown in Fig. 7. The spring 119 is so made and set that it presses its hardest when the angle 120 is such that a dead center condition obtains, this condition being indicated by the center-line 120a which is common to the shaft 117 and to the tracer-point holder 112.

When this occurs, the fitting 105 and the parts 114, 116 and 117, together with a glass radial plate, not shown, are not easily rotatable about the collar 106, because of the friction of spring 119 on the base 104, but rather tend to rotate with collar 106 and the base 104, so that the fitting 105 may be turned about the tracer-point 100 and the dead-center axis 120a of the holder 112 and the shaft 117, until the "knee" 115 is in a direction for emergence of the point 100 from dead-center position. The tracer point 100 then may move from its dead-center position, and then spring 119 will ease its pressure until the fitting 105 is again rotatable about the collar 106.

A similar construction and operation is provided for the other "foot" member 108, such, however, not being shown in the drawings to prevent duplication.

It has been said above that the platforms and turntables are constructed so as to be, preferably, independently vertically adjustable. The details of this construction are shown in Figs. 8 to 21 inclusive.

Fig. 8 represents an elevational view of this modified form of apparatus. The main frame is indicated generally at 200, this corresponding to elements 31, 32 and 33 of Figs. 2, 3 and 4. The right-hand "grasshopper leg" corresponds to Figs. 5, 6 and 7.

In Fig. 8, platforms 201 and 202 are supported by shafts 203 and 204, respectively, these shafts being secured to plates 205 and 206 which form supports for the platforms 201 and 202, respectively, these plates 205 and 206 being made fast to the platforms 201 and 202 respectively.

The shaft 203 slides vertically, as a spindle within a hollow shaft 207, which is prevented from vertical slippage by a collar 208 and pin 209. At the lower end of the hollow shaft 207 is another collar 210 which is locked in place by pin 211, which supports a clamp device 212.

This device is of the type used for "tangent screw motion" on surveying instruments; and which is illustrated in detail with respect to the shaft 204 in Fig. 19, and for purposes of illustration and explanation, shafts 207 and 204 may be described interchangeably, so that the clamping device 212 shown in Fig. 8 is applied also to the shaft 204 in the same way as it has been applied to 207.

If the clamp screw 213 be unscrewed, then shaft 204, or 207, is free to revolve carrying with it the platforms 201 and 202. If clamp screw 213 be tightened the effect is to make lever arm 216 integral with the shaft 204 and platform 202, or with hollow shaft 207, shaft 203, and platform 201. Therefore, if the tangent screw 215 (Fig. 19) be rotated, the lever arm 216, which is held tightly against the end of the screw 215 by a piston 217 and a spring, not shown, in the housing 218, moves horizontally, and imparts slow motion to shaft 204 or 207, and platform 202 or platform 201, as the case may be.

The shaft 203 is adjustable vertically in the shaft 207, as has been mentioned previously. Reference may now be had to Fig. 17 which is a section on the line 17—17 of Fig. 8. As it will be seen from this view, pin 209 has a snug, smooth fit in slot 214 in shaft 203 so that shaft 203 rotates with 207 at all times, but is movable vertically therein.

Near the lower end of the shaft 203 is a collar 219, which collar is snugly but smoothly rotatable about a shoulder 220 of shaft 203. This collar supports pins 221 and 222, which fit snugly and smoothly within approximately horizontal slots in a stirrup 223 at the end of arm 224.

A spring 225, which bears against the collar 210 and arm 224, tends to depress stirrup 223, and therefore arm 224, shaft 203, and platform 201.

Projecting outwardly of the lower surface of the main frame 200 is a standard or bracket 226, at the bottom of which is a stirrup which straddles the arm 224 and to which the arm 224 is pivoted by a pin 227.

Opposing the end 228 of arm 224 is a screw and wheel combination 229 working in and out of threaded hole 230 in the frame 200. Looking directly upwardly at this screw and wheel combination, if it be rotated in a counter-clockwise direction, the end 228 is depressed, and the end 223 is elevated.

This mechanism provides means for compensating for differences in scale between two prints, by raising or lowering one of the two platforms.

Reference may now be had to Fig. 13, wherein there is shown a construction wherein the standard 226 and pin 227 have been moved to a position at the substantial center of the apparatus. Also in accordance with this view the arm 224 has been extended in both directions to support the shafts 203 and 204; the shaft 204 and its related mechanism being duplicates in function of shaft 203 and its associated mechanism, which however is not shown in detail in this view.

Obviously, if the lever 224 moves, both platform 201 and 202 move vertically, if one of these platforms goes up, the other goes down and conversely. In order to control this motion the arm 224 is extended into a stirrup effect as indicated at 231, which is raised or lowered by means of a screw, slot, and take-up spring combination 232, operating in hole 233 in the main frame 200.

The main frame support at the drawing surface 234 is a three-point support, as indicated at points 235, 236 and 237, as shown in Figs. 8, 9, 10, 11, 12 and 13. Although it is not shown in detail in the drawings, each support 235, 236 and 237 embodies in its base, and for direct contact with the drawing surface, wheel and screw combinations functionally identical with wheel and screw combination 229, which operates the end 228 of the arm 224. The purpose of these screw adjustments is to incline the common or parallel planes or platforms 201 and 202 to that of the drawing surface 204, if each inclination be desired, should there be minor tilts or tips in the photographs used on platforms 201 and 202.

Above the upper end of the collar 207 is a pulley wheel 238 (see Fig. 8), and above the middle portion of shaft 207 are side plates 239 and 240, which are rotatably mounted about the shaft 207. These side plates are connected for stiffness, by web 241, which may be integral with the side plates or attached thereto by any suitable means. At the other end of the plates 239 and 240 and extending therethrough is a shaft 242, which is held in its vertical position by a collar 243, and a pin, not shown. The shaft 242 extends downwardly to pivot pin 244 upon which a "grasshopper leg" linkage is mounted, the pivot pin 244 forming the "thigh" thereof, the linkage being attached to the platform 104 of the tracer point support in a manner identical to that described in Figs. 5, 6 and 7.

At the upper end of the shaft 242, there is secured a pulley wheel 245, which is made fast to shaft 242 by a set screw 246. The two pulley wheels 238 and 245 are the same in diameter, and operate rotatably in the same direction by means of a piano-wire belt 247, so that as the tracer point 100 is moved horizontally, the pulley wheel 245 rotates and the pulley wheel 238 follows it.

Fig. 15 shows a detail of the winding of the piano-wire about the pulley wheel, so that more than 360° may be rotated through the normal position in either direction without mechanical stoppage. In the view (Fig. 15) the pulley wheels 238 and 245 are shown with exaggerated vertical dimension, the winding being obvious and representing the spiral of the wire 247, the ends 248 and 249 of which are attached firmly to either wheel, and the middle of which, indicated at 250, is attached firmly to the other wheel.

Fig. 16, which is a view taken on the line 16—16 of Fig. 15, shows the details of a section of the periphery of either pulley wheel at its midway point, and where there are no spokes or webs to interfere, the periphery being indicated as at 251.

A threaded hole 252 is provided, in which there is a set screw 253, the sides of the hole in the direction of the plane of the periphery being channeled as indicated in 254 and 255. The end 248 of the wire 247 passes down channel 254, and the end 249 of the wire 247 passes down channel 255. They both pass around a loosely movable cylindrical plug 256, and are twisted or are otherwise made fast each to the other at point 257.

As the set screw 253 is moved in, the plug 256 moves in also and tightens the wire 247 by virtue of carrying with it the union 257 of ends 248 and 249. It will be noted that the ends 248 and 249 of the wire 247 leave the periphery of the pulley wheel 245, by round smooth curves as indicated at 258 and 259, which may very well be small sheaves for carrying the wire ends 248 and 249 without undue friction.

The construction at the middle point 250 of the wire 247 on the pulley wheel 238 is substantially duplicate of that just described, the only difference being that in this case what is shown as the wire twists of 248 and 249 at 257 becomes simply a loop around plug 256.

By construction, shaft 242 is parallel to shaft 203, and rotatable thereabout, carrying with it pulley wheel 245. Similarly, although not shown in detail, shaft 117 functions with respect to shaft 204. It has been shown previously in this description that the ratio of scale in the transference of detail from photograph to drawing surface depends on the ratio of the distance on the photographs between the respective vertical points of the pictures, and the distance between the center lines of the two shafts which are directly rotated by the "grasshopper legs" as the tracing point functions.

The shafts 242 and 117, rotatable about the shafts 203 and 204, respectively, separate as they rotate, thereby introducing a variation in the distance between the center lines of shafts 242 and 117.

This distance between the center lines should be minimally less than the ordinarily expectable distance between the vertical points on the photographs, and should be increasable to a distance greater than this ordinarily expectable distance between vertical points as measured on the photographs. Thus, for example, the ideal distance on the photographs between vertical points with the 7 inch by 9 inch aerial film in common use in the United States is 2.8 inches, so it may be said that the distances between the center lines of the shafts 242 and 117 usually have minimum value when these shafts are in the same plane with the center lines of shafts 203 and 204, of less than 2 inches. By construction, when shafts 242 and 117 have rotated each 90° and in the same cardinal direction of the distance between these center lines, the distance between them is the same as that between the center lines of shafts 203 and 204, so that it may be said that the maximum distance between center lines of shafts 242 and 117 will be greater than that between the center lines of shafts 203 and 204, which support and center the turntables of 201 and 202.

In order to rotate the shaft 242 about the shaft 203, and the shaft 117 about shaft 204 simultaneously, and so that the line connecting shafts 242 and 117 may be always set in a predictable location, and consequently, that the distance between shafts 242 and 117 will be a predictable distance, there may be utilized the bar and slot 260 and 261, respectively.

This slotted bar 260 may be secured to the main frame 200 in a suitable manner, or it may be integral therewith. Sliding in the slot 261 is screw pin 262 (see Fig. 21) which threads into a slip plate 263, so that when the screw pin 262 is taken up there is a clamping action between the slip plate 263 and the head 264 of the screw pin. A link 265 connects the shaft 242 with the screw pin 262, and a link 266 connects the shaft 117 with the screw pin 262. Therefore, if the screw pin 262 be loosened and moved horizontally in the slot 261, the shafts 242 and 117 will move horizontally and circularly, and will diverge or converge according to the motion of the pin 262.

When the distance between the shafts 242 and 117 is at the desired point, then screw pin 262 may be taken up and the links 265 and 266 become locked tightly by friction to the bar 260. The bar 260 is provided with a scale, a part of which is indicated at 267, so that a computed ratio of enlargement or reduction between the photographs and the map may be utilized in the setting of the positions of the shafts 242 and 117.

It may be noted also that the transparent plate 61 carrying the gauge line as previously described is held, preferably, rigidly by upright member 268, which is hinged at 270 to plate 269, pivoted at 271.

Figs. 22 to 29, inclusive, and 31 represent various details of the mounting of the turntables to the main frame, the "grasshopper leg" linkage system carrying the tracer point being omitted.

The right and left turntables are indicated at 300 and 301, respectively. The main frame is indicated by the channel 302. Supporting the turntables 300 and 301 on this channel are the approximately triangular blocks 303 and 304, which are parts of larger odd shaped blocks 305 and 306, the functions of which will be described later.

Block 305 is held fast to channel 302 by stud screws 307, 308 and 309 and similarly block 306 is secured to channel 302 by screws 310, 311 and 312.

Overhead extension 313 of block 305 carries at its exterior end a pin 314 about which turntable 300 revolves horizontally. In a similar manner, turntable 301 revolves horizontally about pin 315 in overhead extension 316 of block 306.

Figs. 27, 28 and 29 show detail of the clamping means for holding the turntables in proper orientation, the construction shown being applied to the left-hand turntable 301.

It will be seen that a slot 317 is provided in the turntable, which slot is large enough to hold loosely a threaded nut 318. There is also a slot 319 which is small enough to prevent the nut 318 from falling through, the slot 319 receiving threaded stem 321 of a thumb screw 320, which engages the nut 318, and, when desired, clamps on the bottom surface 322 of the top of channel 302, thus locking the turntable 301 in whatever orientation is desired within the limits of angular rotations set by the characteristics of the slots 317 and 319, in the particular illustration for reasons of convenience this being made to give a total throw of 60°. The right-hand turntable 300 is controlled in a similar manner, the details of which are not shown.

Specifically, each turntable is made of two sections, a bottom section and top section, the bottom 324 being preferably made of metal for strength and stiffness, and the top 323 being of fibrous material to which the photographs may be thumb-tacked or otherwise fastened as desired.

At the ends of channel 302 are provided legs 325, 326 and 332, which are conveniently pivoted at their upper ends as at 527, 528 and 333, respectively. These legs are held rigid by means of such as spring pins 329 and 334, which fit into suitable holes provided therefor in the sides of channel 302. Other holes such as 331 and 335 are also provided so that the legs may be folded and held in horizontal position by transferring the pins from one set of holes to the other.

Figure 4:
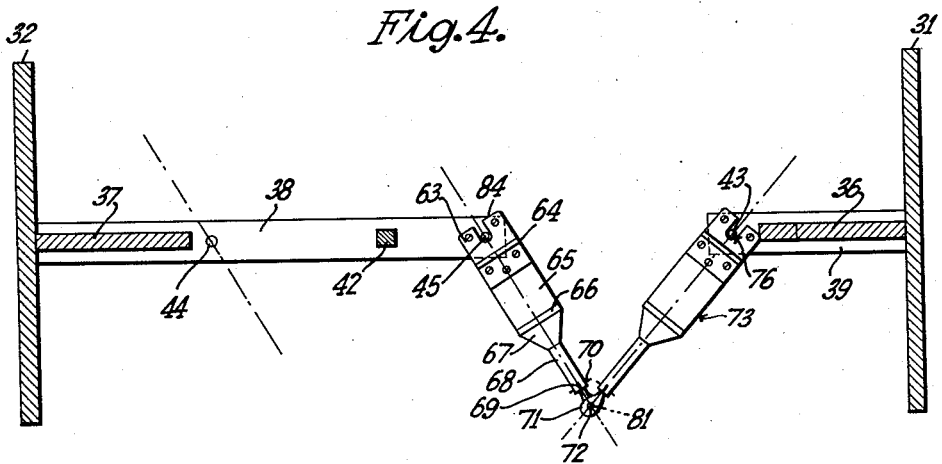
Fig. 4 is a sectional plan view taken on the line 4—4 of Fig. 2, looking in the direction of the arrows.
Figure 3:
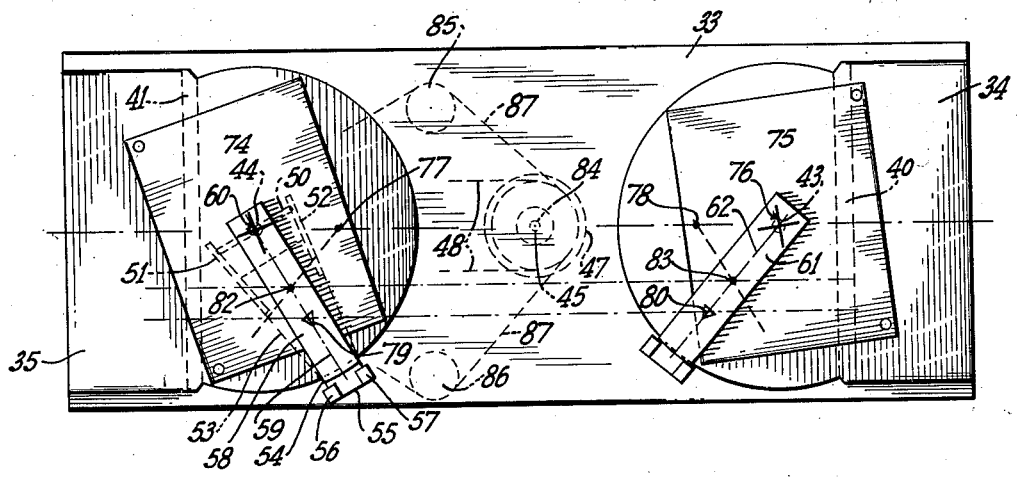
Fig. 3 is a plan view of the construction, the stereoscope being omitted.

It will be seen in Figs. 2, 3 and 4, which views, it will be recalled, illustrate the general construction of the apparatus, that parts 53, 55 and 58 in these views function similarly to the construction described previously in this application, parts 53, 55 and 58 being respectively a plate, an upright block, and a glass plate fastened to the block, the glass plate, upright block and horizontal plate being rotatable about the vertical axis 60 of the left-hand turntable 35. Reference may be made in this connection to the axis marked 342 in Figs. 22, 23 and 24, with particular regard to the above parts of Figs. 2, 3 and 4. Also, there may be noted the vertical studs 336 and 337 which are located at the fore and aft extremities of bar 306. The circumferential face of studs 336 and 337 are distant from the circumferential face of the turntable 301 by an amount sufficient to allow clearance for whatever part may be used which will correspond to part 55 (the upright block 55) of Figs. 2, 3 and 4, in order to swing the glass plate as far clockwise or counter-clockwise as may be necessary, only the part which corresponds to the horizontal plate 53 of Figs. 2, 3 and 4 will engage one or the other face of the triangular block 304, the part corresponding to the plate 53 passing under the overhead extension 316, and over the fore and aft extensions of block 306.

The tops of the studs 336, 337, 338 and 339 will support the four legs of the stereoscope, which may be of any suitable standard construction.

In Figs. 22, 23 and 24 the axis 340 corresponds to the axis 76 of Figs. 2, 3 and 4, axis 341 corresponds to the axis 84, and axis 342 corresponds to axis 60. The mechanism functioning about axis 341 will be connected to the mechanism functioning about axis 342 to move in fixed angular relationship.

Figure 32:
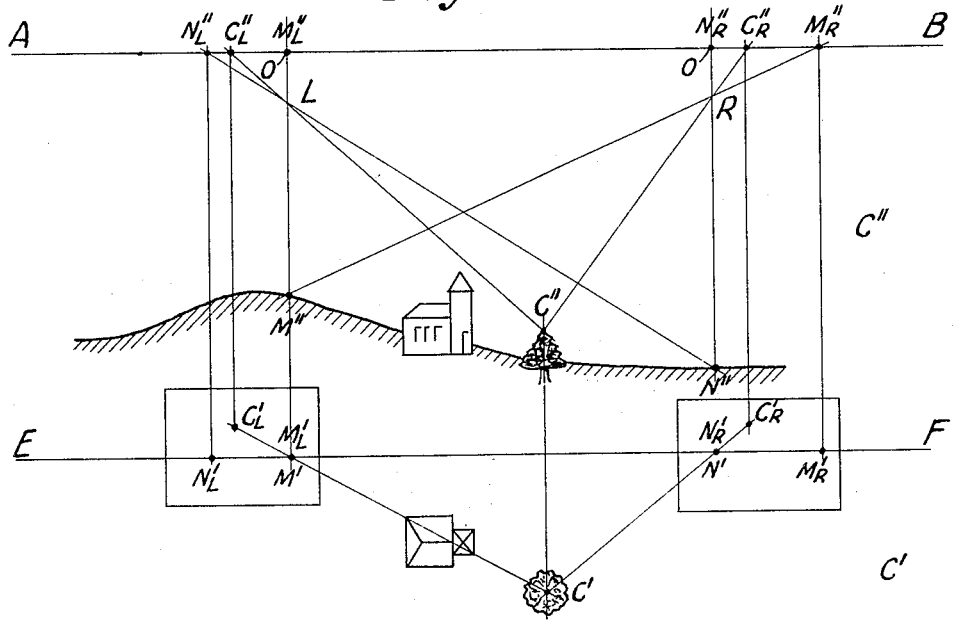
Fig. 32 is a diagrammatic illustration of a way in which the photographs may be made which are adapted to be platted by the apparatus of the present invention.

Referring more particularly to Fig. 32, which shows diagrammatically the manner in which the photographs, which are to be platted by the above-described mechanism, are made, let R and L represent two vertically disposed aerial cameras photographing points N" and M" on a given terrain. Cameras R and L may be assumed to have the same focal length, which may be designated by the line RO and LO, so that the photographic plates for the camera lie in a straight line AB.

Let the line EF represent the intersection of the horizontal and vertical planes in which the terrain to be photographed is located, this vertical plane including, obviously, the cameras R and L. The point M" will be imaged at the point M"$_L$ on the photographic plate of camera L, and point N" will be imaged at N"$_R$ on the photographic plate of the right-hand camera. The line LM"$_L$ corresponds to the focal length LO of the left-hand camera, and the line RN"$_R$ equals the focal length of the right-hand camera.

Since the terrain being photographed is common to both cameras, point N" on the terrain will be in the field of camera L, and the point M" will be in the field of the camera R. The image of point N" on the photographic plate of camera L is represented by point N"$_L$, which is determined by the intersection of a straight line drawn from point N" through camera L to the line AB of the photographic plates. In a similar manner, point M" is imaged in camera R at M"$_R$ on the photographic plate of the right-hand camera.

Now let C" be any other object in the common terrain of the two cameras.

In a manner similar to that already described, the image of point C" in the left-hand camera L is located at C"$_L$ and in the right camera by the point C"$_R$. Since C"$_L$ and C"$_R$ are on the photographic plates of the cameras, and taken through the same camera lenses as were the previously mentioned points, it follows that the image points N"$_L$, C"$_L$, M"$_L$, N"$_R$, C"$_R$ and M"$_R$ are in the same horizontal plane and lie on the same straight line.

Now, the portion of Fig. 32 that centres on and lies below the line EF is supposed to be in the horizontal plane, the portion of the view above the line EF being in a vertical plane, as has been described above.

The horizontal projection of the selected point C" is indicated at C'. The horizontal projections of the points N"$_L$, M"$_L$, N"$_R$ and M"$_R$ are located directly beneath these respective images on the intersection line EF. Therefore, by dropping perpendiculars from these respective points on the line AB to the line EF, there will be located the horizontal projections of these points. Thus, N'$_L$ is the horizontal projection of the image N"$_L$, M'$_L$ is the horizontal projection of the image M"$_L$, N'$_R$ is the horizontal projection of the image N"$_R$ and M'$_R$ is the horizontal projection of the image M"$_R$. Now, since M'$_L$ is directly beneath the camera L, this point is also the horizontal projection of point M" on the terrain being photographed; and, similarly the point N'$_R$ is also the horizontal projection of the point N" of the terrain, so that the horizontal projection of point M", which is represented by M' is coincident with the point M'$_L$, and the point N', which is the horizontal projection of the point N" is coincident with point N'$_R$. Therefore, the point M' represents the vertical point of the left-hand photograph, and the point N' represents the vertical point of the right-hand photograph. When the photographs are to be mounted for platting on the turntables of the apparatus of the present invention, these points M' and N' will be placed in coincidence with the vertical center line of the turntables. It will be seen also that the points N'$_L$, M', N' and M'$_R$ are on the same straight line, and that point N'$_L$ is the image on the left-hand photograph of the vertical point N' of the right-hand photograph, and also it will be seen that the point M'$_R$ is the image on the right-hand photograph of the vertical point M' on the left-hand photograph. Therefore, when the photographs are mounted for platting, they are disposed on the turntables of the apparatus, and are adjusted so that the points N'$_L$, M', N' and M'$_R$ will be on the same straight line.

Now, C' represents the horizontal projection of C", which is any selected point on the terrain. This point C' represents the radial intersection of two lines drawn from C" through the vertical points of both photographs, that is to say through points M' and N' respectively, and continued on to the intersection of a perpendicular dropped from the points C″L and C″R, respectively. Therefore, point C'L is the image of horizontal projection C' on the left-hand photograph, and the point C'R is the image of the horizontal projection C' on the right-hand photograph. Since the intersection of the lines drawn from the image C'R through the right vertical point N' and from the image point C'L through the left vertical point M' makes the radial projection of that point C' as so indicated, it follows that the line C'LC' and the line C'RC' corresponds to the left-hand and right-hand gauge lines marked on the glass plates of the present apparatus.

Figure 33:
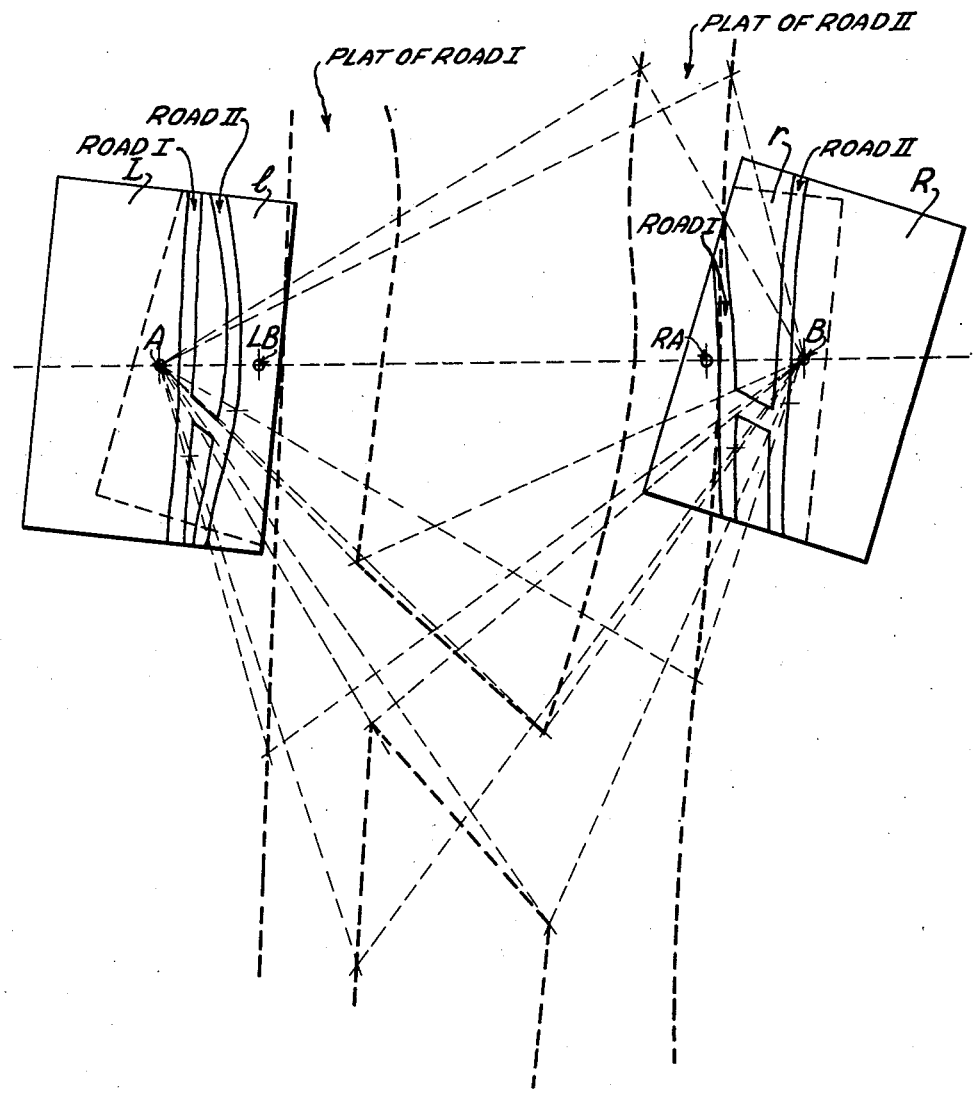

Referring now to Fig. 33, L and R represent the prints of two aerial photographs, taken in the manner described in connection with Fig. 32. These photographs have a common overlap area designated by the dotted lines and indicated generally by $l$ and $r$ respectively. As was mentioned earlier in this description, suppose the photographs are of a terrain which includes two roads which are to be platted. Road I crosses a plain and road II crosses a mountain. Therefore, the photographs will show these roads with a horizontal displacement from their true position.

The problem now is to plat these roads so as to produce a map thereof showing the two roads in their true position and free from horizontal displacement effects. Let A be the vertical point of photograph L, and B the vertical point of photograph R. LB represents the image of vertical point B of the right-hand photograph on the left-hand photograph, and point RA represents the image of the vertical point A of the right-hand photograph on the left-hand photograph. These points correspond to the points N'L and M'R of Fig. 32, and were determined in a similar manner. As described above, the photographs are positioned relative to each other so that the points A, LB, RA and B will lie on the same straight line, or on a line of desired specifications, which may be, under certain conditions, a line with a sharp angle in it, where the photographs have angular as well as spacial off-sets, the whole effecting a compression of the equipment, suitable mechanical and optical equipment being employed to take up the slack between the basic axes and the "grasshopper-leg" linkage; or the line may be any defined line provided that the off-set mechanism changed its dimensional functioning as the various vertical point images changed their locations on this line. Usually, however, this line will be a straight line, and, for simplicity, it is so illustrated in the drawings and explained herein. In order to plat road I and road II, it is necessary to find the location of the radial projections of a plurality of points on the two roadways, and then connect the resulting projections of these points. This is done by drawing straight lines from each vertical point A and B through corresponding points on the two roadways being platted, the intersection of such lines representing the radial projections of the respective points. These radial lines are shown by the dotted lines in Fig. 33 emanating from the vertical points A and B, and by connecting the respective intersections of these lines, there results the plat of road I and the plat of road II, which plats represent the proper relationship of the roads free from horizontal displacement.

It will be noted that the operations outlined in Fig. 33 represent a series of drafting operations.

Figure 34:
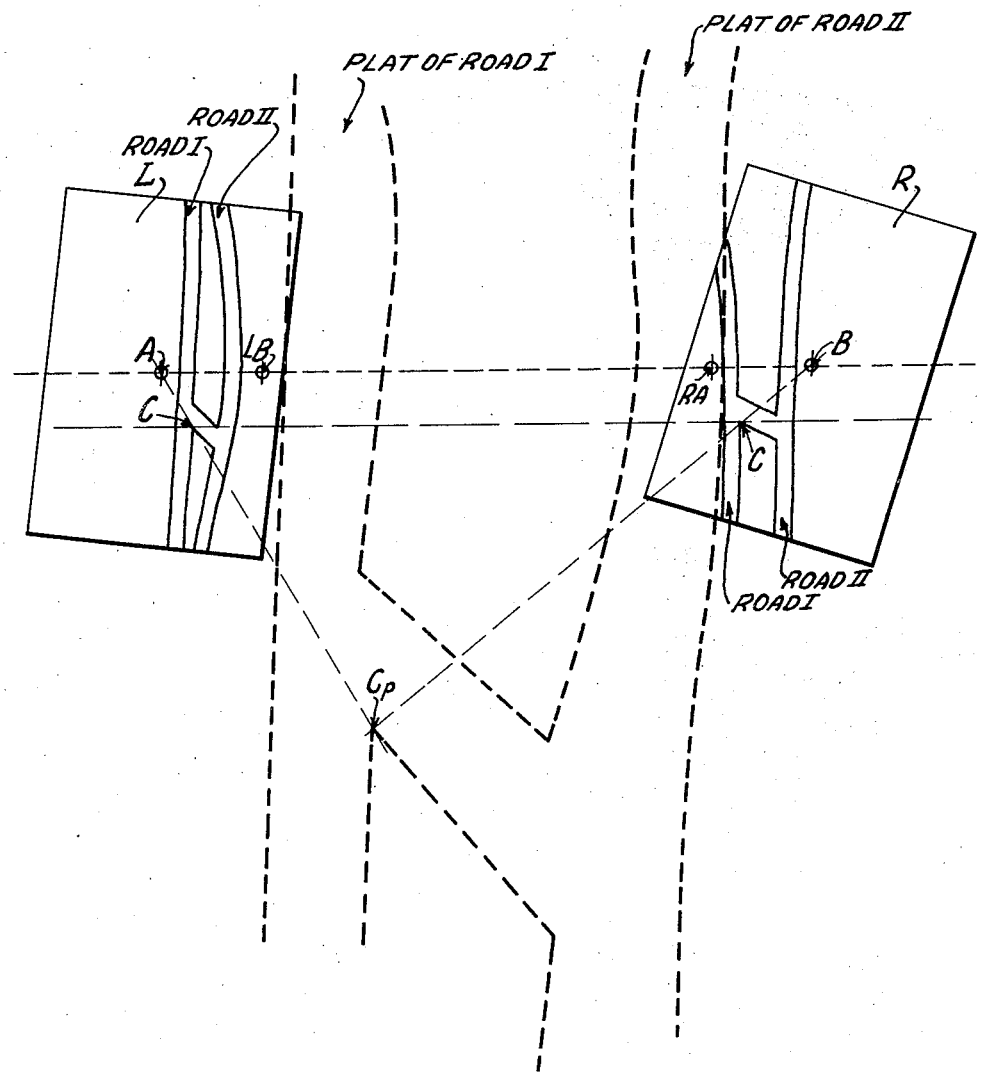

Fig. 34 shows in more detail the manner of locating similar points on the two photographs.

Again, let L represent the left-hand photograph and R the right-hand photograph with A as the vertical point of the left-hand photograph, B the vertical point of the right-hand photograph, LB being the image of B on L and RA being the image of A on R. It is again desired to plat road I and road II as described in Fig. 33. Of course, in order to produce the plat of these roads, a sufficient number of points may be platted by radial intersection as described in Fig. 33 to give when connected a representation of the outline of the respective roads. For purposes of explanation, however, the platting of a single selected point by radial intersection may be given. Assume point C is some such selected point lying on one of the roadways. As has been described above, the photographs are positioned with respect to each other so that the points A, LB, RA and B lie on the same straight line. Then if C is any selected point on one of the roadways on the left-hand photograph, the corresponding point on the right-hand photograph will lie at the intersection of the same side of the road as point C on the left-hand photograph is located with a straight line drawn through point C on the left-hand photograph parallel to the straight line connecting the points A, LB, RA and B. Then by drawing straight lines through the points A and C on the left-hand photograph and points B and C on the right-hand photograph, and continuing these lines until they intersect, that intersection, which we may designate as $C_p$ represents the radial projection of the point C, and locates the point on the plat of the roadways which correspond to the selected point C on the photographs. The straight lines $ACC_p$ and $BCC_p$ represent the radial intersecting lines of the point C, and correspond to the gauge lines on the glass plates of the apparatus described herein.

Now, in order to use the present apparatus, it has been said that the photographs are placed on the left-hand and right-hand turntables, respectively, of the apparatus, and are then viewed through a suitable type of stereoscope mounted on the frame of the apparatus. Again the photographs are mounted so that their vertical points and the image of each vertical point on the other photograph are caused to lie on the same straight line.

Now, assume the conditions to be as they are described in connection with Fig. 34, referring to Fig. 35 in this explanation. The left-hand photograph L (see Fig. 35) and the right-hand photograph R are mounted on the left and right-hand turntables, respectively, of the apparatus so that the points A, LB, RA and B lie on the same straight line.

With the gauge lines on the glass plates passing through the selected point C on each photograph, they take a position similar to the lines $ACC_p$ and $BCC_p$ of Fig. 34; and these gauge lines will intersect at a point remote from the apparatus which corresponds to the point $C_p$.

Figure 35:
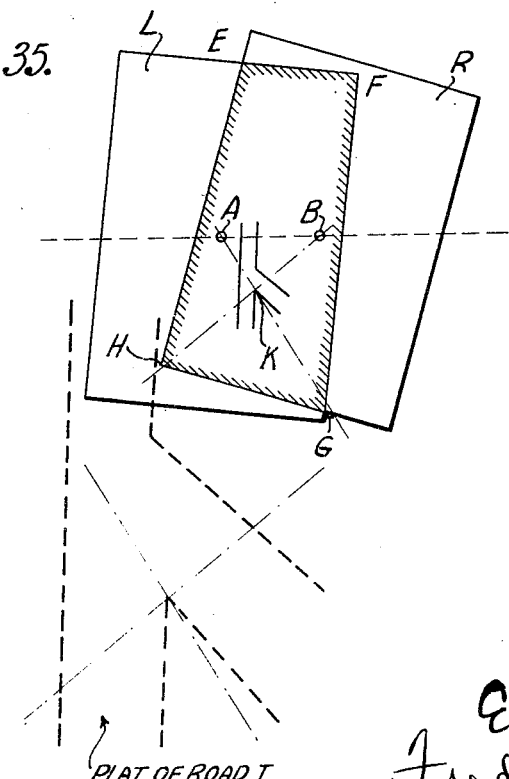
Figs. 33, 34 and 35 are diagrammatic illustrations of the action of the present improved mechanism.

Now, with the set-up as described, when viewed through the stereoscope, the images of the roadways on the two photographs are brought into coincidence, the overlapping area common to the two photographs being shown as a topographic relief area indicated at E, F, G and H of Fig. 35, the point A representing the vertical point of L and the point B representing the vertical point of R. The point $C_p$ of Fig. 34 which is the apparent intersection of the gauge lines of the glass plate of the apparatus, appears imaged under the stereoscope as the intersection K, which appears on the topographic relief image of the roadways at a point corresponding to our selected point C of Fig. 34.

It is to be borne in mind that the tracer point of the apparatus is at a point corresponding to or parallelly off-set from the actual intersection of the radial lines ACC$_p$ and BCC$_p$ of Fig. 34, which corresponds in turn to the intersecting point of the gauge lines of the apparatus. Therefore, with the conditions as shown in Fig. 35, when the tracing point is moved, the image of the intersection K will appear to move correspondingly, so that by manipulating the tracer point of the present apparatus over a drawing surface with corresponding movement of the image point K following continuously the outline of the roadways to be platted, the tracer point will plat a path which corresponds to the radial projection of every point on the outline of the roads being platted, so that if the manipulations of the tracer point are such that there be no deviation of the point K from the outline of the roadways, the resulting plat will be a representation, accurate in scale, of the relationship between the roadways, free from vertical displacement effects, and this plat will be made as a continuous operation, rather than as a series of independent drafting steps.

It may be noted that this right-hand "grasshopper leg" linkage lies axially parallel with the right-hand gauge line of the apparatus, and that the left-hand "grasshopper leg" linkage is axially parallel with the left-hand gauge line.

Also, it may be noted that the stereoscope referred to herein may be dispensed with where points to be platted are coordinate or surveyed points, and such points may be platted sequentially by bringing first one and then the other of the gauge lines 59 and 62 through the corresponding point and platting its radial projection by the tracer point.

For accomplishing this purpose, the strips 58 and 61 may be held or locked selectively against rotation, so that either one may be moved independently of the other, so that first one gauge line may be brought through a selected point on one photograph and then held in that position while the other gauge line is brought through the corresponding point on the other photograph by suitable manipulation of the holder of the tracer point. The resulting position of the tracer point gives the projection of the radial intersection of the selected point; and this operation is repeated for the remaining selected points.

This procedure gives, of course, only an intermittent or sequential platting of coordinate points as against the continuous platting effected by the use of the stereoscope, but which may be of importance.

However, for continuous platting, the stereoscope may be replaced by other viewing instrumentalities, which are known, and which will enable continuous platting operations to be carried out, but probably without obtaining any true relief or stereoscopic effects of the terrain being platted.

Although the platting of terrain shown in substantially vertical aerial photographs is an important application of the present apparatus, it will be understood that maps or any other surface representation, photographic or otherwise, that displays the desired area which is to be platted, may be substituted for the aerial photographs without change in structure of the apparatus. Accordingly, the term "vertical aerial photographs" as employed in the present description and claims is intended to have a generic meaning which includes such representations of the desired area or points, or locations to be platted, whether such representations be photographic or otherwise.

It will be apparent from the above description that these specifically described details of the contruction of the apparatus may be varied considerably from the details as have been illustrated and described herein, without departing from the spirit of the invention; and accordingly, it will be understood that the invention is not limited, necessarily, to these specific details of the process and construction as are herein specifically described, it being apparent that such details are subject to various modifications which will become apparent readily to one skilled in the art, without departing from the invention; and it will be understood, therefore, that it is intended and desired to include within the scope of the invention such modifications and changes as may be necessary to adapt it to varying conditions and uses. It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for platting surfaces, free from displacement effects, from vertical aerial photographs having overlapping areas, which comprises the combination with a frame, of a pair of platforms carried by the frame, the said platforms being disposed in approximately the same horizontal plane and adapted to receive the said photographs, mechanism associated with the platforms adapted to indicate the radial projection of any selected point on the photographs, and instrumentalities corresponding to the said radial projection for platting by radial intersection any desired portion of the overlapping areas of the photographs, the said mechanism comprising transparent plates mounted on the platforms, the plates having gauge lines thereon extending radially of the platforms, mounting means for the plates holding the said plates in engagement with the top surfaces of the platforms while permitting movement of the plates around the platforms while maintaining the gauge lines continuously radially disposed relatively to the platforms, and means for effecting radial adjustment of the plates relative to the platforms.

2. Apparatus for platting surfaces, free from displacement effects, from substantially vertical aerial photographs having overlapping areas, which comprises the combination with a frame, of photograph-receiving means carried by the frame, mechanism associated with the said means adapted to indicate the radial projection of any selected point on the photographs, the said mechanism comprising devices radially mounted on the photograph-receiving means and having indicating means thereon extending radially of the said photograph-receiving means, projections of the said indicating means intersecting at a point corresponding to the radial projection of any selected point common to the two photographs, rotatable supports for the photograph-receiving means having their center lines coincident with the centers of the said means and mounting instrumentalities for the said radially mounted devices connecting the said devices and supports for enabling radial rotation of the devices about the said photograph-receiving means responsively to rotation of the shafts, a tracer point corresponding to the intersection of the said indicating means, and hinged link instrumentalities interconnecting the tracer point and rotatable supports for rotating the latter and the said radially mounted devices responsively to movement of the tracer point, the said link means being positioned axially in vertical planes passing through the respective gauge lines.

3. Apparatus for platting surfaces from vertical aerial photographs, which comprises the combination with a frame, of horizontal supporting means for supporting photographs, vertical supporting shafts for the supporting means carried by the frame, transparent gauge plates secured to the supporting means and turnable thereabout, and being adapted to rest upon the photographs with the latter in place, a gauge line on the transparent plates, each gauge line defining with the respective supporting shaft a vertical plane, the resulting vertical planes intersecting remotely from the photographs, link means connected to each vertical shaft, a tracing member secured to the link means and adapted for universal movement in a horizontal plane, the said tracing member being positioned in the intersection of the said vertical planes, movement of the tracing member producing corresponding movement of the gauge plates, whereby the tracing member may be caused to reproduce on a drawing surface the configuration of any selected overlapping area on the said photographs, and stereoscopic means for viewing the photographs and gauge lines.

4. Apparatus for platting surfaces from vertical aerial photographs, which comprises the combination with a frame, of horizontal mounting means for the photographs, supporting shafts for the mounting means carried by the frame, radially extending gauge members hingedly mounted on the said mounting means for turning about the said mounting means, and defining with the supporting shafts intersecting vertical planes, a tracing device, and hinged link members interconnecting the tracing device with the supporting shafts adapted to enable the tracing device to move in all directions in any plane, movement of the tracing member producing a corresponding movement of the gauge devices, the said tracing member being positioned in the intersection of vertical planes defined by the gauge devices and the supporting shafts, whereby the tracing device may be caused to follow the shape of any selected area common to the photographs for reproducing the shape of the said area on a drawing surface free from relief displacements of the photographs.

5. Apparatus for platting surfaces from vertical aerial photographs, which comprises the combination with a frame, of horizontal platforms for supporting the photographs, vertical supporting shafts for the platforms carried by the frame, transparent gauge plates mounted on the platforms and turnable thereabout responsively to rotation of the shafts and being adapted to rest upon the photographs with the latter in place, a gauge line on the transparent plates, each gauge line defining with the respective supporting shaft a vertical plane, the resulting vertical planes intersecting remotely from the photographs, link means connected to each vertical shaft, a tracing member secured to the link means and adapted for universal movement in any plane, the said tracing member being positioned in the intersection of the said planes, movement of the tracing member producing corresponding movement of the gauge plates, whereby the tracing member may be caused to reproduce on a drawing surface the contour of any selected overlapping area on the said photographs.

6. Apparatus for platting surfaces from aerial vertical photographs having overlapping areas, which comprises the combination with a frame, of horizontal mounting means on the frame adapted to support the said photographs so that the images of the ground vertically below each photograph at instant of exposure will lie on the same straight line, vertical supporting means for the said mounting means, gauge devices secured to the mounting means and adapted to be applied to the photographs, tracing means, and supporting instrumentalities for the tracing means including hingedly-mounted links secured to the tracing means and to said vertical supports adapted to enable substantially universal movement of the tracer point and to produce corresponding rotation of the said vertical supports and gauge devices, the said links being in the same vertical planes with the said vertical supports and gauge devices, whereby the tracing means may be made to outline continuously on a drawing surface the configuration of any selected portion of the said photographs.

7. Apparatus for platting surfaces from vertical aerial photographs, which comprises the combination with a frame, of mounting means for the photographs, supporting shafts for the mounting means carried by the frame, radially-extending gauge means mounted on the mounting means adapted to be applied to the photographs and to turn with the mounting means, a tracing device, and hinged link means interconnecting the tracing device and the supporting shafts enabling the tracing device to have universal movement in a horizontal plane, the said tracing device being located at the intersection of vertical planes defined by the gauge means, supporting shafts and the hinged link means, whereby the tracing means may be caused to follow any selected outline of overlapping area of the said photographs, thereby reproducing on a drawing surface the true configuration of such area independently of any relief distortions in the said photographs.

8. Apparatus for platting surfaces, free from displacement effects, from substantially vertical aerial photographs having overlapping areas, which comprises the combination with a frame, of a pair of horizontal platforms carried by the frame and adapted to receive the said photographs, vertical shafts supporting the platforms, instrumentalities connected with the shafts and extending over the platforms adapted to indicate the radial projection of any selected common point on the photographs, devices corresponding to the said radial projection for continuously platting by radial intersection any desired portion of the overlapping areas of the photographs, an actuating vertical shaft, a sheave on one of the aforesaid shafts and on the actuating shaft, means for transmitting movement from the actuating shaft to the said vertical shaft, and hinged link means connecting the said platting devices to the vertical actuating shaft to the other platform-supporting shaft, the said hinged link means lying in the same vertical plane with the projection-indicating instrumentalities and the said actuating shaft being positioned at such predetermined distance from the platform-supporting and gauge plate-actuating shafts to give a predetermined scale ratio between the photographs and resulting plat.

9. Apparatus for platting surfaces, free from displacement effects, from substantially vertical aerial photographs having overlapping areas, which comprises the combination with a frame, of a pair of platforms carried by the frame and adapted to support the said photographs, vertical shafts on which the said platforms are mounted in related horizontal planes, means associated with the platforms adapted to indicate the radial projection of any selected common point on the photographs, instrumentalities corresponding to the said radial projection for continuously platting by radial intersection any desired portion of the overlapping areas of the photographs, and means for predetermining and adjusting scale ratios between the plat and photographs for predeterminedly enlarging and diminishing, selectively, the relative size of the plat to the photographs, the said means comprising vertical shafts parallel to the platform shafts and in the same vertical plane with the projection-indicating means, means mounting the scale-adjusting shafts for rotation around the platform shafts as axis, sheaves on the platform shafts and on the scale-adjusting shafts, and pulley belts connecting the sheaves, whereby the distance between the scale-adjusting shafts may be varied responsively to rotation of the scale-adjusting shafts around the platform shafts to vary correspondingly the scale ratio between photographs and plat, the scale adjusting shafts being rotated by manipulation of the platting instrumentalities and transmitting rotation through the sheaves to the platform-shafts to operate the projection means correspondingly to the manipulation of the platting instrumentalities.

10. Apparatus as claimed in claim 9, including belt take-up means for the pulley wheels, the take-up means comprising a threaded recess in the pulley wheel, the recess being provided with oppositely-disposed channels adapted to receive the ends of the said belt, a set screw in the recess, and a plug in the recess engaging the inner end of the set screw and a loop of the belt formed by union of the belt ends, the said loop extending over the plug, whereby as the set screw is moved inwardly, the plug is moved inwardly correspondingly, carrying with it the union of the ends of the said belt.

11. Apparatus for platting plane surfaces, free from displacement effects, from vertical aerial photographs having overlapping areas, which comprises the combination with a frame, of a pair of horizontal platforms carried by the frame and adapted to support the said photographs, vertical shafts supporting the platforms and vertically movable in the frame, mechanism associated with the platforms adapted to indicate the radial projection of any selected point on the photographs, instrumentalities corresponding to the said radial projection for continuously platting by radial intersection any desired portion of the overlapping areas of the photographs, and mechanism for adjusting the said platforms relatively to each other to cause them to be in related horizontal planes, the said mechanism comprising supporting brackets depending from the frame, rocking levers pivotally mounted on the brackets having one end engaging the said vertical shafts, adjusting screw means engaging ends of the levers remote from the shafts, and a compression spring around the ends of the shafts adjacent to the shaft-ends of the levers and abutting against the levers and a vertically-fixed abutment, whereby the levers are pressed against the adjusting screws, manipulation of the adjusting screws causing a corresponding vertical rocking motion of the levers to vertically adjust the shafts to bring and to hold the said platforms in related horizontal planes.

12. Apparatus for platting maps from photographs having overlapping areas, comprising in combination, means for mounting a pair of photographs in substantially the same plane, means for indicating the radial projection of any selected point on the photographs, movable tracer means including a tracer point, and means coupling said tracer means with each of said indicating means, said coupling means comprising a plurality of hinged links, the hinge pins of each of said couplings being perpendicular to its associated indicating means and to the axis of rotation thereof.

13. Apparatus for platting maps from photographs having overlapping areas, comprising in combination, means for mounting a pair of photographs in substantially the same plane, rotatable means for indicating the radial projection of any selected point on the photographs, offset axis means responsive to rotation of one of said indicating means, movable tracer means including a tracer point, and means coupling said tracer means with said offset axis means and the other of said indicating means, said coupling means comprising a plurality of hinged links, the hinge pins of each of said couplings being perpendicular to its associated indicating means and to the axis of rotation thereof.

14. Apparatus for platting maps from photographs having overlapping areas, comprising in combination, means for mounting a pair of photographs in substantially the same plane, means for indicating the radial projection of any selected point on the photographs, offset axis means for each of said indicating means and responsive to rotation thereof, movable tracer means including a tracer point and means coupling said tracer means with each of said offset axis means, said coupling means comprising a plurality of hinged links, the hinge pins of each of said couplings being perpendicular to its associated indicating means and to the axis of rotation thereof.

15. Apparatus for platting maps from photographs having overlapping areas, comprising in combination, means for mounting a pair of photographs in substantially the same plane, means for varying the plane of one photograph from that of the other, rotatable means for indicating the radial projection of any selected point on the photographs, movable tracer means including a tracer point, and means coupling said tracer means with each of said indicating means whereby said tracer point is automatically caused to lie at a point corresponding to the intersection of the projections of said indicating means, said coupling means being such that said tracer point may lie within a perpendicular through the axis of rotation of either of said indicating means.

16. Apparatus for platting maps from photographs having overlapping areas, comprising in combination, means for mounting a pair of photographs in substantially the same plane, means for varying the plane of one photograph from that of the other, means for indicating the radial projection of any selected point on the photographs, offset axis means for each of said indicating means and responsive to rotation thereof, movable tracer means including a tracer point and means coupling said tracer means with each of said offset axis means whereby said tracer point is automatically caused to lie at a point corresponding to the intersection of the projections of said indicating means, said coupling means being such that said tracer point may lie within a perpendicular through either of said offset axis means.

17. Apparatus for platting maps from photographs having overlapping areas, comprising in combination, means for mounting a pair of photographs in substantially the same plane, rotatable means for indicating the radial projection of any selected point on the photographs, means for viewing both of said photographs and said indicating means simultaneously, offset axis means responsive to rotation of one of said indicating means, movable tracer means including a tracer point, and means coupling said tracer means with said offset axis means and the other of said indicating means whereby said tracer point is automatically caused to lie at a point corresponding to the intersection of the projections of said indicating means, said coupling means being such that said tracer point may lie within a perpendicular through said offset axis means.

18. Apparatus for platting maps from photographs having overlapping areas, comprising in combination, means for mounting a pair of photographs in substantially the same plane, means for indicating the radial projection of any selected point on the photographs, means for viewing both of said photographs and said indicating means simultaneously, offset axis means for each of said indicating means and responsive to rotation thereof, movable tracer means including a tracer point and means coupling said tracer means with each of said offset axis means whereby said tracer point is automatically caused to lie at a point corresponding to the intersection of the projections of said indicating means, said coupling means being such that said tracer point may lie within a perpendicular through either of said offset axis means.

EDWIN HOWARD CORLETT.

CERTIFICATE OF CORRECTION.

Patent No. 2,196,723. April 9, 1940.

EDWIN HOWARD CORLETT.

It is hereby certified that error appears in the printed specification of the above numbered patent requiring correction as follows: Page 5, first column, line 43, after the reference numeral "44" insert --determine the vertical plane which has been--; and that the said Letters Patent should be read with this correction therein that the same may conform to the record of the case in the Patent Office.

Signed and sealed this 18th day of June, A. D. 1940.

(Seal)

Henry Van Arsdale,
Acting Commissioner of Patents.